(12) United States Patent
Owen et al.

(10) Patent No.: US 10,190,550 B2
(45) Date of Patent: Jan. 29, 2019

(54) CONDENSATE DISPERSION ASSEMBLY (71) Applicant: GM GLOBAL TECHNOLOGY OPERATIONS LLC, Detroit, MI (US)

(72) Inventors: Shawn M Owen, Ortonville, MI (US); Travis Sperow, Davisburg, MI (US); Susan A Jeske, Clio, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 15/364,646

(22) Filed: Nov. 30, 2016

(65) Prior Publication Data

US 2018/0149121 A1  May 31, 2018

(51) Int. Cl.
| F02M 35/10 | (2006.01) |
| F02B 29/04 | (2006.01) |
| F02D 9/02 | (2006.01) |
| F02M 35/024 | (2006.01) |
| F02M 35/104 | (2006.01) |

(52) U.S. Cl.
CPC ... F02M 35/10281 (2013.01); F02B 29/0406 (2013.01); F02D 9/02 (2013.01); F02M 35/024 (2013.01); F02M 35/104 (2013.01); F02M 35/10255 (2013.01)

(58) Field of Classification Search
CPC .... F02D 2200/0418; F02D 2200/0406; F02M 25/0818; F02B 29/0468; F02B 29/0418
See application file for complete search history.

(56) References Cited

U.S. PATENT DOCUMENTS

| 4,151,862 | A | * | 5/1979 | Ueda | F16K 31/0655 |
| | | | | | 137/629 |
| 5,676,405 | A | * | 10/1997 | Reed | A47L 11/34 |
| | | | | | 251/149.6 |
| 7,083,157 | B2 | * | 8/2006 | Kingsford | F16K 31/1221 |
| | | | | | 251/107 |
| 7,530,336 | B2 | | 5/2009 | Brecheisen, II | |
| 7,546,935 | B2 | * | 6/2009 | Wheaton | B67D 1/0832 |
| | | | | | 137/212 |
| 9,010,112 | B2 | | 4/2015 | Palm | |
| 9,267,424 | B2 | * | 2/2016 | Wicks | F02B 29/0468 |
| 9,382,836 | B2 | * | 7/2016 | Maceroni | F02B 33/44 |
| 9,409,108 | B2 | * | 8/2016 | Lin | B01D 35/153 |
| 2004/0244782 | A1 | * | 12/2004 | Lewallen | F02B 29/0418 |
| | | | | | 123/568.12 |
| 2007/0107425 | A1 | | 5/2007 | Appleton | |
| 2014/0076289 | A1 | | 3/2014 | Ruona et al. | |
| 2014/0102428 | A1 | * | 4/2014 | Fulton | F02B 29/0468 |
| | | | | | 123/568.12 |
| 2015/0176478 | A1 | * | 6/2015 | Wicks | F02B 29/0468 |
| | | | | | 60/599 |

(Continued)

Primary Examiner — Long T Tran (57) ABSTRACT

A condensation dispersion device for a turbocharged vehicle engine includes a valve body, a movable valve, and a biasing means. The movable valve and biasing means are disposed within the valve body. The valve body defines a valve seat within the valve body, and includes an inlet and an outlet. The movable valve defines an engagement feature operatively configured to engage with the valve seat when the movable valve is in a first position. The biasing means is operatively configured to urge the movable valve to a second position when the pressure in the intake manifold is equal to or greater than atmospheric pressure.

14 Claims, 6 Drawing Sheets

(56) References Cited

U.S. PATENT DOCUMENTS

| | | | |
|---|---|---|---|
| 2015/0176480 A1* | 6/2015 | Maceroni | F02B 33/44 60/599 |
| 2016/0090894 A1* | 3/2016 | Sato | F01P 7/14 137/544 |
| 2016/0160744 A1* | 6/2016 | Wicks | F02B 29/0468 60/599 |

* cited by examiner

CONDENSATE DISPERSION ASSEMBLY

TECHNICAL FIELD

The invention relates generally to vehicle engines, and in particular, vehicle engines which are turbocharged or supercharged.

BACKGROUND

Turbocharged and supercharged engines may be configured to compress ambient air entering the engine in order to increase power. Because compression of the air may cause an increase in air temperature, a charge air cooler may be utilized to cool the heated air thereby increasing its density and further increasing the potential power of the engine. If the humidity of the ambient air is high, however, condensation (e.g., water droplets) may form on any internal surface of the charge air cooler that is cooler than the dew point of the compressed air. During transient conditions such as hard vehicle acceleration, these water droplets may be blown out of the charge air cooler and into the combustion chambers of the engine resulting in increased potential for engine misfire, loss of torque and engine speed, and incomplete combustion, for example.

One approach for reducing the amount of condensation entering the combustion chambers is disclosed in US Patent Application Publication 2011/0094219 A1. In the cited reference, a condensation trap for a charge air cooler that reduces the rate at which condensation enters the combustion chambers of the engine is disclosed. The condensation trap includes a reservoir for collecting the condensate and a tube for releasing the condensate back to the outlet duct.

The inventors herein have recognized various issues with the above system. In particular, the condensation trap is positioned downstream of the charge air cooler and thus can only collect condensation downstream from an outlet of the charge air cooler. This configuration may not adequately address condensation trapped within the charge air cooler. Furthermore, condensation traps necessitate additional componentry that may increase the cost and the packaging space of the charge air cooler.

As such, one example approach to address the above issues includes a charge air coder comprising an inlet to admit charge air, a plurality of heat exchange passages to remove heat from the charge air, an outlet configured to discharge the charge air from the heat exchange passages to an intake passage upstream of an intake manifold of an engine, and a dispersion element extending at least partially across the outlet.

In this way, condensate that accumulates in the charge air coder may be driven out of the coder via movement of the charge air. However, the condensate which enters the engine during idle conditions may be problematic in that the engine is likely to misfire under these conditions.

The above advantages and other advantages, and features of the present description will be readily apparent from the following detailed description when taken alone or in connection with the accompanying

SUMMARY

Accordingly, the present disclosure provides a condensation dispersion device for a vehicle engine using a turbocharger. The condensation dispersion device includes a valve body, a movable valve, and a biasing means. The movable valve and biasing means are disposed within the valve body. The valve body defines a valve seat having a top/upper surface within the valve body, and includes an inlet end and an outlet. The movable valve defines an engagement feature operatively configured to engage with the valve seat when the movable valve is in a first closed position. The biasing means is operatively configured to urge the movable valve to a second open position when the pressure in the intake manifold is equal to or greater than a specified operating pressure.

In another embodiment of the present disclosure, a condensate dispersion assembly for a vehicle engine using a turbocharger includes an intake manifold, a throttle body, a dispersion device and a charge air cooler. The intake manifold may be operatively configured to transfer air from an intake passage to a combustion chamber. The throttle body may actuated by a throttle actuator. The throttle body may be affixed to the intake manifold at an intake opening of the intake manifold. The dispersion device may be affixed to the intake manifold such that an outlet of the dispersion device is disposed within the intake manifold and an inlet is disposed outside of the intake manifold. The charge air cooler may be coupled to the throttle body via the intake passage and coupled to the intake manifold via a condensate hose and the dispersion device.

The condensate dispersion device may, but not necessarily, comprise a quick connect coupling the inlet of the dispersion device to a hose outlet. The dispersion device may be operatively configured to open and close the flow of condensate into the intake manifold. The dispersion device may also include a valve body housing a biasing means, and a movable valve. The biasing means may be operatively configured to urge the movable valve from a first position to a second position. The movable valve may operatively configured to slide to the first position and the biasing means is operatively configured to compress when pressure inside of the intake manifold drops below atmospheric pressure.

The movable valve may be urged by the biasing means to the second position when pressure inside of the intake manifold is at or above atmospheric pressure. The biasing means may, but not necessarily, be in the form of a spring which has a spring rate which exceeds atmospheric pressure. It is also understood that the movable valve may include a flange which engages with a valve seat defined in the valve body when the movable valve is in the first position. Moreover, the movable valve may, but not necessarily, include a plurality of radial ribs operatively configured to maintain the axial position of the movable valve within the valve body.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIG. 1 is a schematic diagram of a vehicle engine system.

FIG. 2A is a side view of a non-limiting example dispersion device when the valve is closed.

FIG. 2B is a cross-sectional view of the valve seat in FIG. 2A along line A-A.

FIG. 2C is a top view of the filter of FIG. 2A.

FIG. 2D a side view of the filter and valve seat implemented in the dispersion device in FIG. 2A.

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1:
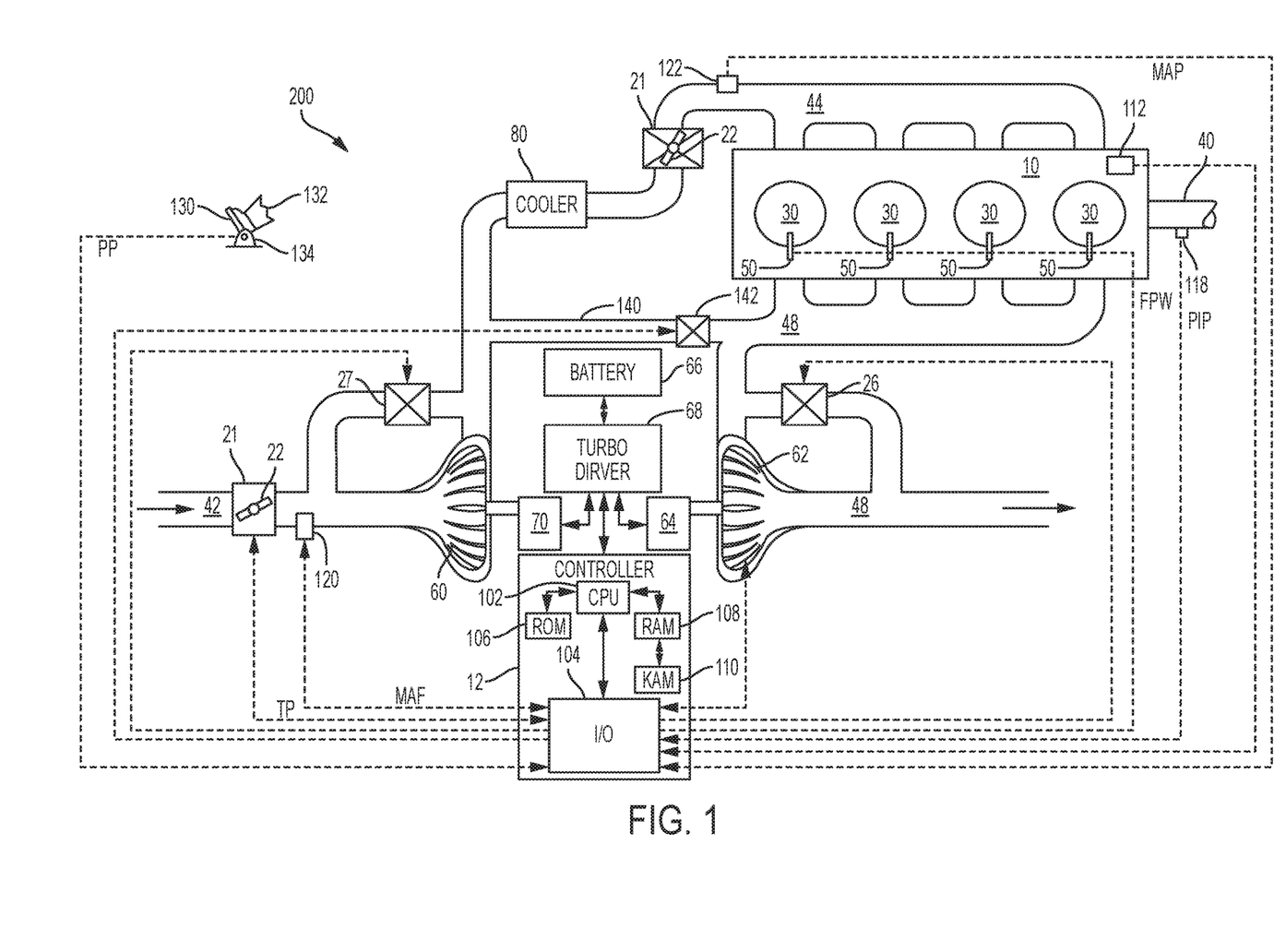

Referring now to FIG. 1, a schematic diagram for a vehicle engine 10 system is shown where the vehicle engine system implements a charge air cooler.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves. Further, intake and exhaust valves may be part of a variable valve timing system configured to open and close the valves at different timings depending on operating conditions.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle 21 control (ETC). In this manner, throttle 21 may be operated to vary the intake air provided to combustion chamber 30 among other engine cylinders. In some embodiments, additional throttles may be present in intake passage 42.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine 10 may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine 10 and/or an electric machine, and may not include a turbine. Thus, the amount of compression provided to one or more cylinders of the engine 10 via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. As described in more detail below, charge air cooler 80 and the intake manifold 44 may include a dispersion element to disperse accumulated condensate into droplets that may be evaporated by the moving charge air and directed to the intake manifold of the engine 10.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Figure 2A:
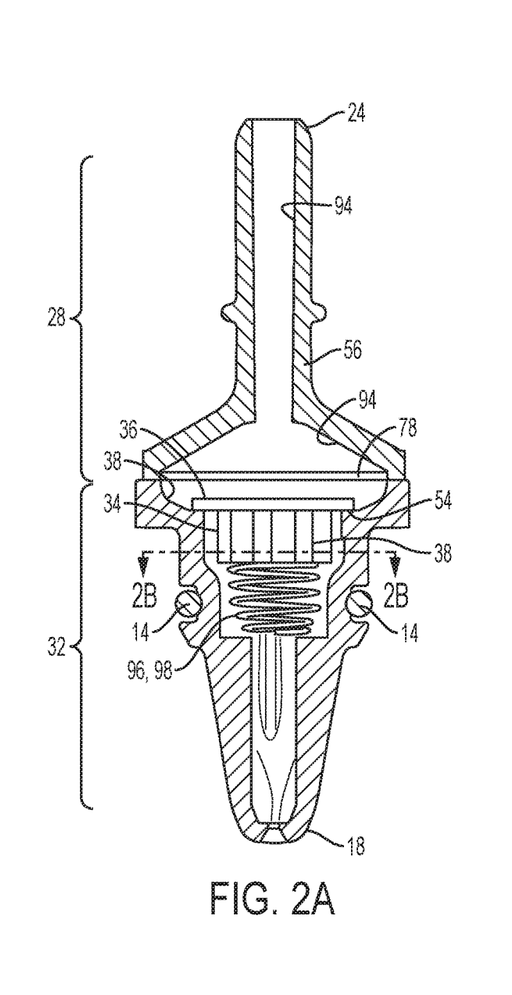
Figure 4:
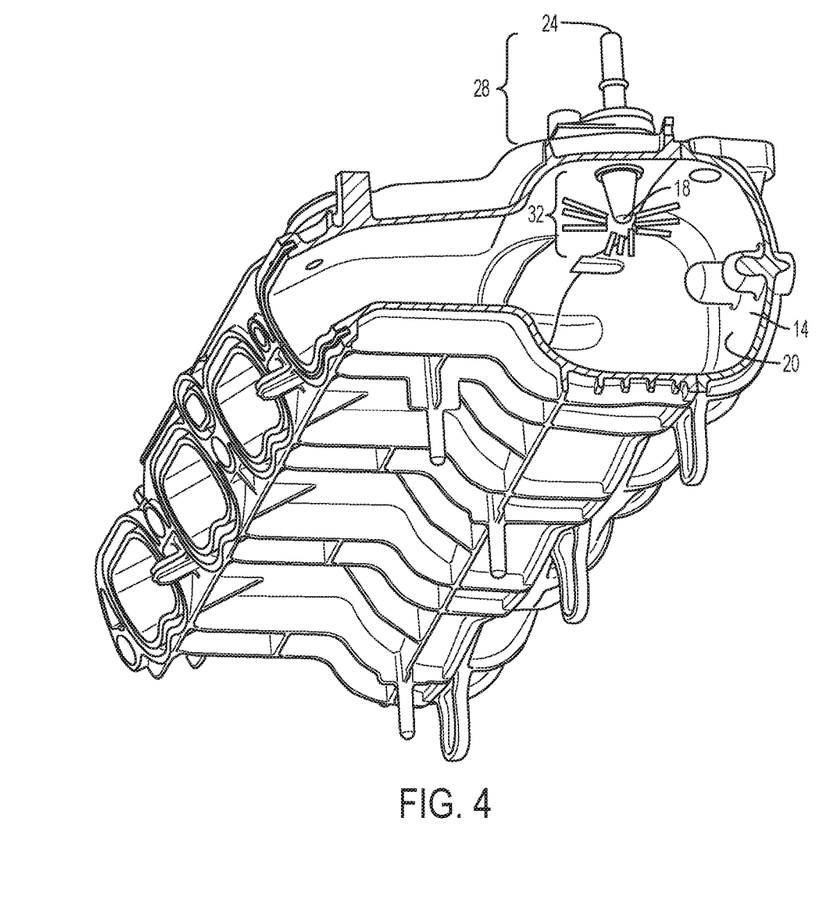
FIG. 4 is a perspective view of non-limiting example an intake manifold having a non-limiting example dispersion device affixed to the intake manifold.
Figure 5:
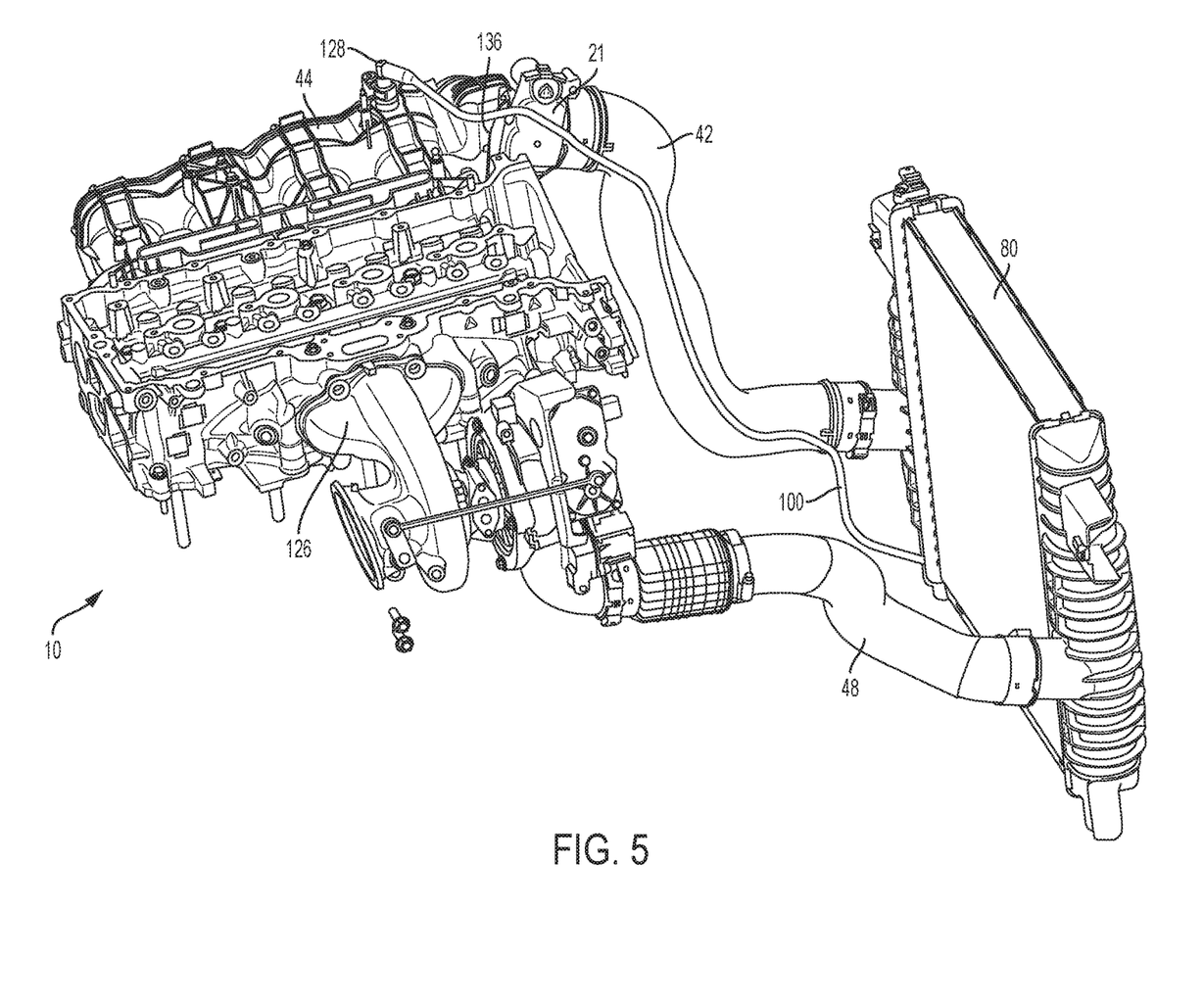
FIG. 5 is a perspective view of a condensate dispersion assembly according to various embodiments of the present disclosure.
Figure 6:
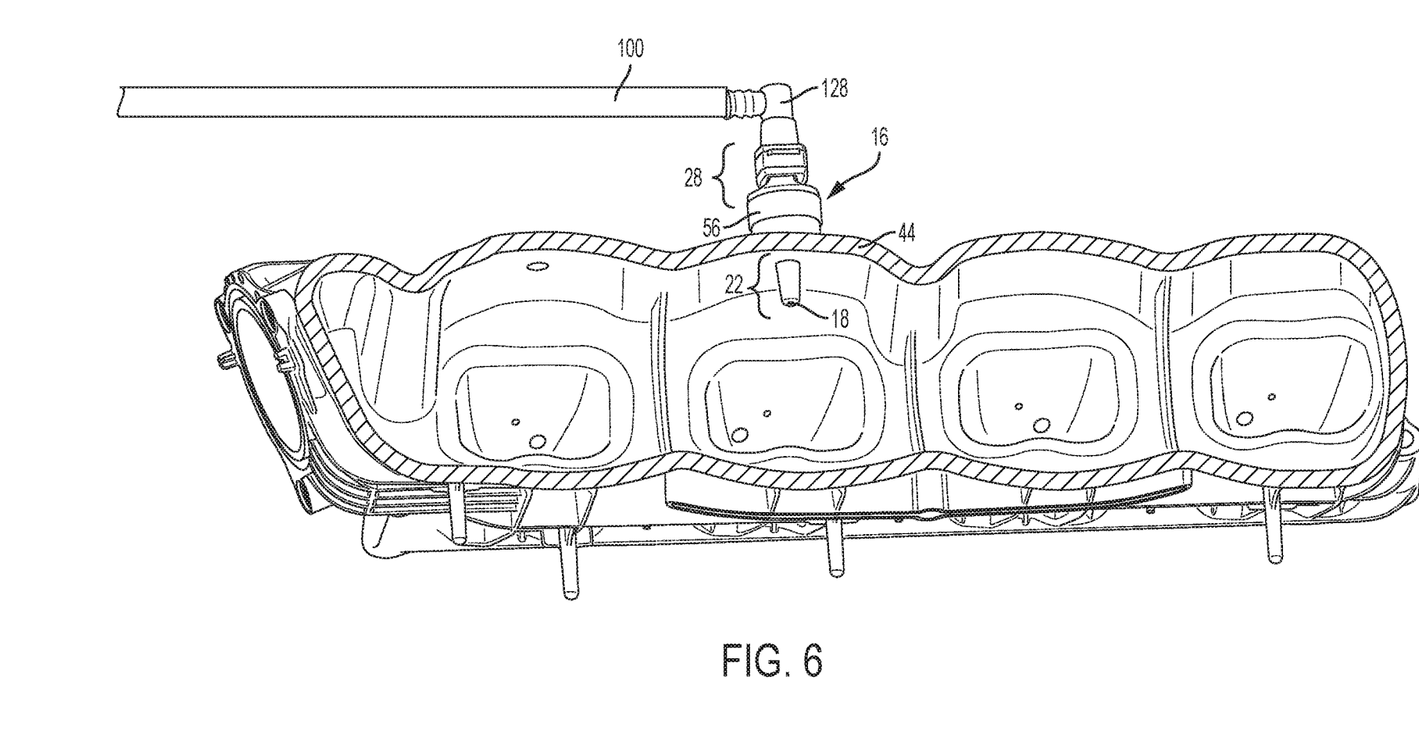
FIG. 6 is a side view an intake manifold having a non-limiting example dispersion device affixed to the intake manifold.

As shown, FIG. 2A illustrates a side view of a non-limiting example dispersion device 16 when the valve 34 is a first (closed) position. The dispersion device 16 may be affixed to an intake manifold 44 at O-ring 14 (as shown in FIGS. 4-6) such that the dispersion device 16 is received in an aperture defined in the intake manifold so that the outlet 18 and outlet side 32 is disposed within the chamber 20 of the intake manifold 44 while the inlet 24 and the inlet side 28 of the dispersion device 16 is disposed outside of the chamber 20 of the intake manifold. FIG. 2A further illustrates a movable poppet valve 34 disposed within valve chamber 94. The poppet valve 34 which moves between a first (closed position (shown in FIG. 2A) and a second (open) position (shown in FIG. 3). As shown the valve chamber 94 extends from the inlet 24 through the valve body 56 and to the outlet 18. The movable poppet valve 34 may include a flange 36, cylindrical body 72, and at least one radial guide rib 52 as shown in FIGS. 2A-2D. The flange 36 is operatively configured to engage with the valve seat 54 formed in the valve body 56 so as to prevent condensate flow 58 from traveling from the inlet 24 to the outlet 18. As shown, at least a portion of the underside of the circular flange 36 abuts the top surface of the valve seat 54 to stop condensate flow 58 from traveling from the inlet side 28 of the dispersion device 16 to the outlet side 32 of the dispersion device 16.

Figure 2B:
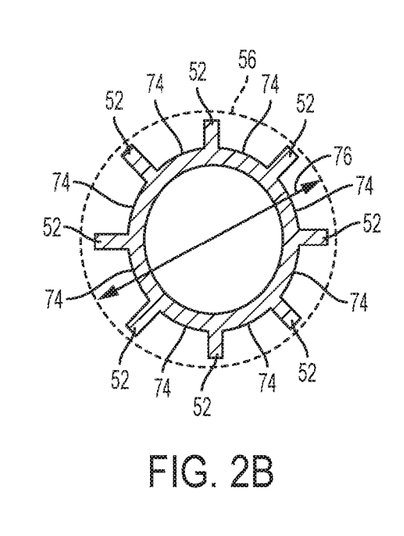
Figure 2C:
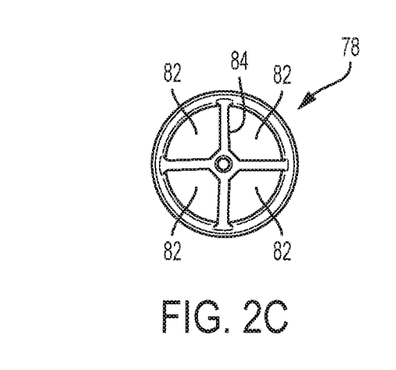

As shown in FIG. 2B, the non-limiting example poppet valve 34 includes a plurality of ribs (or at least one rib) 52 which extends away from the cylindrical body 72. As shown, the ribs 52 define at least one channel 74 for the condensate flow 58 to pass through. Given that FIG. 2B illustrates a plurality of ribs 52, a channel 74 is defined between each rib 52 as shown so as to allow condensate flow 58 to pass around the substantial circumference of the flange 36 of the valve 34. As shown, the radial guide ribs 52 maintain the axial position of the cylindrical body 72 within the valve chamber 94. As shown in FIGS. 2A and 2C, a filter 78 may optionally be provided within the dispersion device 16 wherein the filter 78 is fixed within the body of the dispersion device 16 above the poppet valve 34. The cylindrical body 72 and the radial rib guides 52 of the poppet valve 34 are disposed within the first inner diameter 76 of the valve body 56. The flange 36 of the poppet valve 34 has a diameter which may be greater than the first inner diameter 76 so that at least a portion of the underside of the flange engages with the valve seat 54 to stop the condensate flow 58 from travelling from the inlet side to the outlet side of the dispersion device 16. As shown, the flange 36 is disposed within a section of the valve chamber 94 having a core cavity 138. It is understood that the width 139 along any portion of the core cavity 138 is greater than the first inner diameter 76.

Figure 2D:
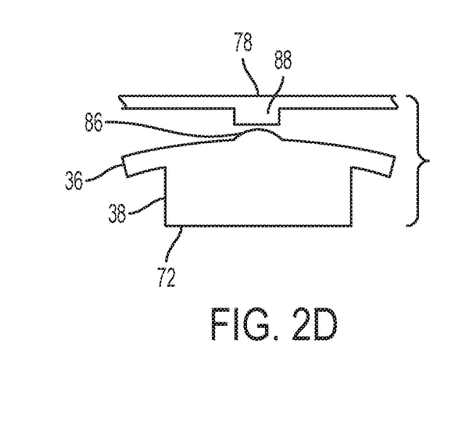

As shown, a filter 78 may be affixed within the valve chamber 94. The filter 78 may include a screen like material 82 to prevent solid particles from flowing through the dispersion device 16 and into the intake manifold 44. The screen like material 82 may be flexible and may be supported by a frame 84. With reference to FIG. 2D, it is further understood that the poppet valve 34 may include a rounded boss 86 which is operatively configured to abut against the filter 78 or a protrusion/tab 88 defined in the frame 84 of the filter 78. The rounded boss 86 of the poppet valve 34 prevents the poppet valve 34 from sticking to the filter 78 as the poppet valve 34 moves between the first and second positions as the pressure on the outlet side 32 of the dispersion device 16 changes relative to the pressure on the inlet side 28 of the dispersion device 16. It is understood that the pressure on the inlet side 28 of the dispersion device 16 is generally maintained at or near atmospheric pressure while the pressure on the outlet side 32 of the dispersion device 16 will change fluctuate down to levels below atmospheric pressure creating a vacuum on the outlet side 32 of the dispersion device 16.

Figure 3:
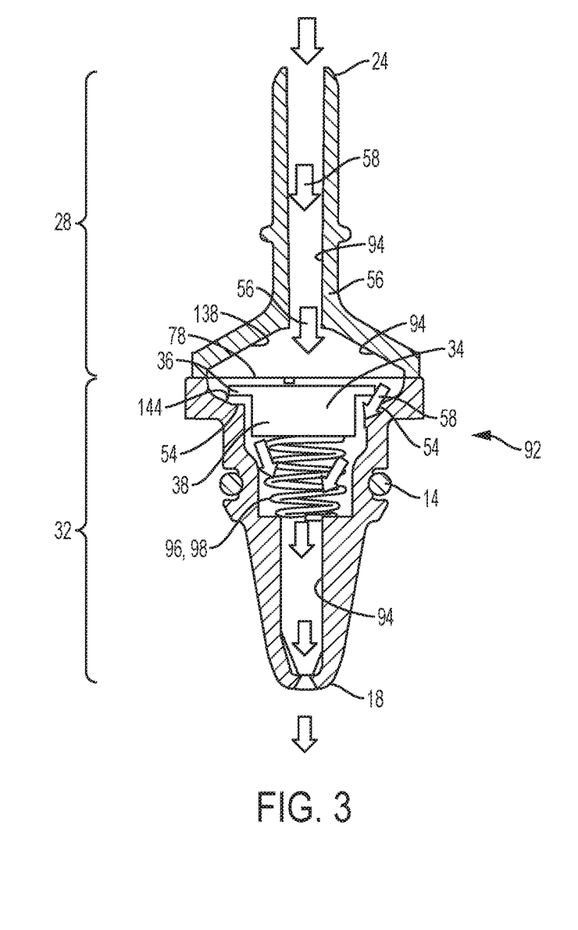
FIG. 3 is a schematic diagram of a non-limiting example dispersion device illustrating the path for the condensate flow when the valve is open.

Referring now to FIG. 3, a schematic diagram of a non-limiting example dispersion device 16 illustrates the dispersion device 16 in the second (open) position. In the second position, a gap 144 is created around the flange (between the flange and the valve seat 54) which allows the condensate flow 58 to travel from the inlet side 28 to the outlet side 32. In order for the poppet valve to move from the first position to the second position, the vacuum that existed in the outlet side of the dispersion device (and within the intake manifold) is eliminated as pressure in the intake manifold (and outlet side of the dispersion device) increases. It is understood that, when a vacuum condition exists, the vacuum may overcome the biasing means 98 or spring 96 thereby compressing the spring 96 and holding the poppet valve in the first position (shown in FIG. 1). Accordingly, as the vacuum is eliminated and pressure on the outlet side and intake manifold increases the spring 96 or biasing means 98 may urge the poppet valve 34 to move toward the inlet 24 and filter 78 thereby opening the valve 34 and creating a gap 144 between the flange 36 and valve seat 54 for the condensate flow 58 from the inlet 24 to the outlet 18. It is understood that the pressure in the intake manifold increases (from the vacuum condition) when a vehicle operator presses on the accelerator thereby triggering the throttle body 21 to open up the throttle plate 22 so as to allow air to flow into the intake manifold which increases the pressure within the intake manifold.

Referring back to FIG. 2A, a side view of a non-limiting example dispersion device 16 illustrates the dispersion device 16 in the first (closed) position. Under these conditions, the pressure within the intake manifold (on the outlet side 32 of the dispersion device 16) is lower than atmospheric pressure such that a vacuum exists within the intake manifold. This lower pressure/vacuum exists when the operator takes his or her foot off of the accelerator causing the throttle 21 to close. When the throttle 21 is closed and the combustion chambers of the engine 10 take in air from the intake manifold, a vacuum exists in the intake manifold such that the pressure within the intake manifold (on the outlet side 32 of the dispersion device 16) is lower than the pressure on the inlet side 28 of the dispersion device 16 (atmospheric pressure). The vacuum thereby overcomes the biasing means 98 and causes the poppet valve 34 to travel to the first closed position which prevents condensate flow 58 to travel toward the intake manifold. As indicated earlier, the vehicle engine 10 is subject to misfires when condensation enters the combustion chambers during idle engine conditions. Accordingly, the condensate dispersion assembly 8 which may include the dispersion device 16, throttle 21, intake manifold, and charge air cooler prevents condensation from flowing into the combustion chambers during idle engine conditions via the passive valve 92 in the dispersion device 16.

Accordingly, FIGS. 2A and 3 illustrate the components of the dispersion device 16. As shown, the condensation dispersion device 16 for a turbocharged vehicle engine 10 includes a valve body 56, a movable valve 34, and a biasing means 98. The movable valve 34 and biasing means 98 are disposed within the valve body 56. The valve body 56 defines a valve seat 54 within the valve body 56, and defines a valve chamber 94 which extends from an inlet 24 and an outlet 18. The movable valve 34 defines an engagement feature or flange 36 operatively configured to engage with the valve seat 54 when the movable valve 34 is in a first closed position as shown in FIG. 2A. The biasing means 98 is operatively configured to urge the movable valve 34 to the first closed position when the pressure in the intake manifold 44 is equal to or greater than atmospheric pressure.

With reference to FIG. 4, the dispersion device 16 is disposed within an aperture in the intake manifold such that the outlet 18 of the dispersion device 16 is disposed within the interior of the intake manifold. The inlet 24 of the dispersion device 16 is disposed outside of the intake manifold. The outlet 18 of the dispersion device 16 may be operatively configured to spray out the condensation into the intake manifold so that the fluid may be dispersed before the fluid particles travel through the manifold passageways which enter the combustion chambers. Referring now to FIGS. 4 and 6 together, the inlet 24 of the dispersion device 16 may be coupled to the delivery hose 100 from the charge air cooler via a quick connect.

Referring now to FIG. 5, an example vehicle engine 10 system is shown which includes a turbocharger 126 affixed to an engine 10. The exhaust gases from the engine 10 drive the turbocharger's 126 turbine which, in turn, spins the compressor's impeller. The compressor's impeller draws in and compresses fresh air which increases in temperature due to the compression by the turbocharger. The hot/compressed air is then sent to the charge air cooler 80 via the exhaust passage 48. As shown, the exhaust passage 48 couples the turbocharger 126 to the charge air cooler 80. Once the heated air travels through the charge air cooler 80, the temperature of the air drops and condensation may be created. The cooled air is transferred from the charge air cooler 80 to the intake manifold 44 via the intake passage 42. However, it is understood that the throttle body 21 is disposed between the intake passage 42 and the intake manifold 44. The throttle body 21 is triggered by the vehicle operator at the accelerator pedal 130 (shown in FIG. 1). Therefore, when the vehicle operator actuates the accelerator pedal 130, the throttle body 21 opens up and allows air to flow from the intake passage 42 to the intake manifold 44 thereby increasing the pressure inside of the intake manifold 44. When the throttle body 21 closes, then the pressure inside of the intake manifold 44 drops as the combustion chambers 30 of the vehicle engine 10 take in any remaining air from the intake manifold 44.

Accordingly, FIG. 5 illustrates a condensate dispersion assembly 8 for a vehicle engine using a turbocharger wherein the condensate dispersion assembly 8 includes an intake manifold 44, a throttle body 21, a dispersion device 16 and a charge air cooler 80. The intake manifold 44 may be operatively configured to transfer air from an intake passage 42 to a combustion chamber 30. The throttle body 21 may actuated by a throttle actuator 130. The throttle body 21 may be affixed to the intake manifold 44 at an intake opening 136 of the intake manifold 44. The dispersion device 16 may be affixed to the intake manifold 44 such that an outlet of 18 the dispersion device 16 is disposed within the interior of the intake manifold 33 and an inlet 24 is disposed outside of the intake manifold 44. The charge air cooler 80 may be coupled to the throttle body 21 via the intake passage 42 and coupled to the intake manifold 44 via a condensate hose 100 and the dispersion device 16.

As indicated earlier, the change in pressure within the intake manifold (outlet side of the valve body) relative to the atmospheric pressure (on the inlet side of the valve body) causes the passive poppet valve 34 in the dispersion device 16 to move between an open and closed position so that condensation cannot travel through the valve chamber 94 of the dispersion device 16 from the inlet side 28 to the outlet side 32 and into the intake manifold. As shown, hose 100 connects the charge air cooler to the intake manifold and the hose 100 is attached to the dispersion device 16 via a quick connect.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A condensate dispersion assembly comprising:
an intake manifold operatively configured to transfer air from an intake passage to a combustion chamber;
a throttle body actuated by a throttle actuator, the throttle body being affixed to the intake manifold at an intake opening of the intake manifold;
a dispersion device affixed to the intake manifold and having an outlet disposed within the intake manifold and an inlet disposed outside of the intake manifold;
a movable valve disposed within the dispersion device; and
a charge air cooler coupled to the throttle body via the intake passage and coupled to the intake manifold via a hose and the dispersion device;
wherein the movable valve is configured to move from a first closed position to a second open position when the intake manifold pressure falls below the atmospheric pressure due to the atmospheric pressure urging the movable valve to the second open position.

2. The condensate dispersion assembly of claim 1 further comprising a quick connect coupling the inlet of the dispersion device to a hose outlet.

3. The condensate dispersion assembly of claim 1 wherein the movable valve is operatively configured to open and close the flow of condensate into the intake manifold.

4. The condensate dispersion assembly of claim 3 wherein the dispersion device includes a valve body housing the biasing means and the movable valve, the biasing means operatively configured to urge the movable valve from the second open position to the first closed position.

5. The condensate dispersion assembly of claim 4 wherein the movable valve is urged by the biasing means to the second open position when pressure inside of the intake manifold is at or above atmospheric pressure.

6. The condensate dispersion assembly of claim 4 wherein a biasing means is a spring which has a spring rate which exceeds atmospheric pressure.

7. The condensate dispersion assembly of claim 4 wherein the movable valve includes a flange which engages with a valve seat defined in the valve body when the movable valve is in the first closed position.

8. The condensate dispersion assembly of claim 4 wherein the movable valve includes a plurality of radial ribs operatively configured to maintain the axial position of the movable valve within the valve body.

9. A dispersion device comprising:
a valve body having an inlet disposed outside of an intake manifold and an outlet disposed inside of an intake manifold, and the valve body defining a valve seat inside of the valve body;
a movable valve disposed within the valve body, the movable valve having an engagement feature operatively configured to engage with the valve seat when the movable valve is in a first closed position; and
a biasing means disposed within the valve body, the biasing means urging the movable valve to a second open position;
wherein the movable valve is configured to move from the first closed position to the second open position when the intake manifold pressure falls below the atmospheric pressure thereby causing the atmospheric pressure to urge the movable valve to the second open position.

10. The dispersion device of claim 9 further comprising an o-ring coupling the valve body to the intake manifold.

11. The dispersion device of claim 9 wherein the valve body is coupled to a condensate hose at the inlet of the valve body.

12. The dispersion device of claim 9 further comprising a filter fixed within the valve body.

13. The dispersion device of claim 9 wherein the biasing means is a spring.

14. The dispersion device of claim 9 wherein the movable valve is operatively configured to abut a filter when the movable valve is in the second position.

* * * * *